(No Model.)
J. DEMAREST.
FILTER.
No. 324,541. Patented Aug. 18, 1885.
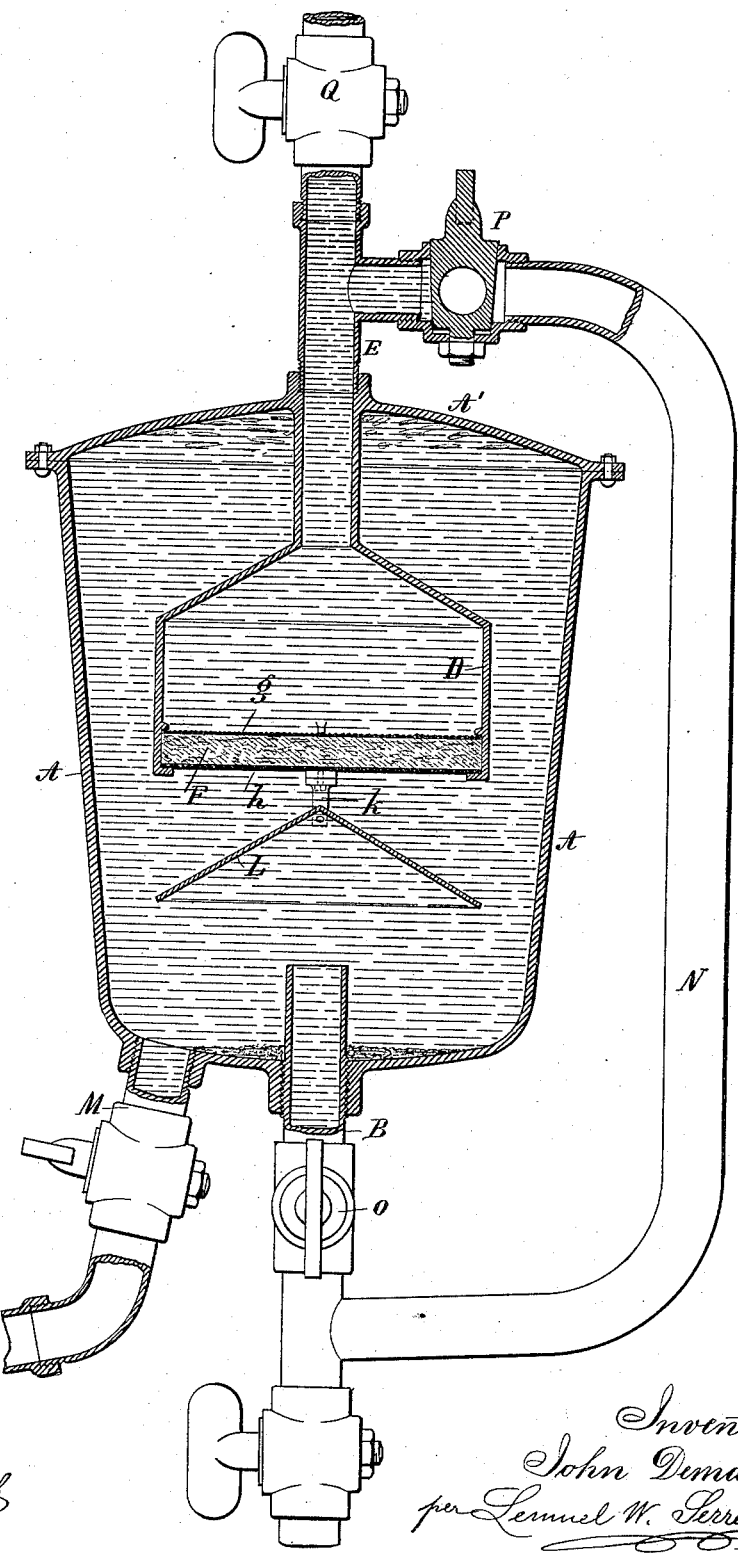
Witnesses
J. Staib
Chas. H. Smith
Inventor
John Demarest
per Lemuel W. Serrell Atty.

UNITED STATES PATENT OFFICE.

JOHN DEMAREST, OF NEW YORK, N. Y.

FILTER.

SPECIFICATION forming part of Letters Patent No. 324,541, dated August 18, 1885.

Application filed February 9, 1885. (No model.)

*To all whom it may concern:*

Be it known that I, JOHN DEMAREST, of the city and State of New York, have invented an Improvement in Filters, of which the following is a specification.

Filters have been made in which the liquid ascends through the filtering medium, in order that the solid materials that are separated may subside in the bottom of the vessel instead of resting upon the filtering material.

My invention is made for separating the light substances—such as chips, leaves, &c.—from the portion of the water passing through the filter; for supplying the water above the level of the sediment; for deflecting the rush of water from the filter material, and for washing out the filter and filter-vessel and discharging sediment periodically.

In the drawing I have represented my improvement by a vertical section.

My improvement is especially intended for filtering river and brook water in which straws, chips, and other floating substances are found, and which often pass into the supply water-pipes, together with small fish and muddy and other foreign substances.

The vessel A is of suitable size and shape. and to the bottom of the same the supply water-pipe B is attached, and it projects up into the inside of the vessel A to a level higher than sediment is liable to accumulate under ordinary circumstances of use.

Within the vessel A there is a filter-vessel, D, having an open bottom end and a closed upper surface connected to the discharge-pipe E that passes out through the top A' of the vessel A.

The filtering material may be of any desired character. I usually employ felt or sponge at F between two disks, *g h*, of wire-cloth, secured at their edges to the inner surface of the filter-vessel D.

There is a cross-bar, *k*, attached to the lower end of this filter-vessel D, and to this the conical or concave deflector L is attached. This deflector is above the upper end of the supply water-pipe B, so that the water will be deflected and not strike against the surface of the filtering material.

There is a waste-pipe and cock at M, through which the sediment can be discharged from the bottom of the vessel A as often as desired.

There is a branch pipe, N, extending from the pipe B around the filter and uniting with the discharge-pipe E. This pipe, by preference, is entirely outside the filter, and there are cocks or valves at O, P, and Q. Under ordinary circumstances the cocks P and M are closed and the cock O open. The cock Q may illustrate the faucet or faucets by which water is drawn in a building.

Any foreign substances passing by the pipe B into the vessel A are deflected with the water by the cone L. and the heavy materials sink into the bottom of the vessel A around the pipe B. The light substances that float pass by the filter-vessel D and accumulate in the upper part of the vessel A, and the felt or other filtering material strains off other foreign substances from the water that passes through the filter, and some of these foreign substances subside when the water is quiescent.

By opening the cocks M and P and closing the cock O water will pass by the pipe N around the filter and enter at the top of the filter by the pipe E and wash out the filter, the sediment and foreign materials going off by the discharge-pipe and cock M.

I claim as my invention—

The combination of the vessel A, having inlet-pipe B, rising above the bottom thereof, and the filtering-vessel D, suspended below the top of said vessel A and connecting to the outlet-pipe E, so as to leave space between the top of the vessels A and D and the deflector L above the inlet-pipe and below the filtering-vessel, as set forth, whereby light foreign substances will be retained in the top of such vessel A, as specified.

Signed by me this 4th day of February, A. D. 1885.

JOHN DEMAREST.

Witnesses:
 GEO. T. PINCKNEY,
 WILLIAM G. MOTT.